(12) United States Patent
Edge et al.

(10) Patent No.: US 6,362,808 B1
(45) Date of Patent: *Mar. 26, 2002

(54) ARRANGEMENT FOR MAPPING COLORS BETWEEN IMAGING SYSTEMS AND METHOD THEREFOR

(75) Inventors: Christopher J. Edge, St. Paul; Timothy A. Fischer, Mendota Heights; William A. Rozzi, West Lakeland Township, all of MN (US)

(73) Assignee: Minnesota Mining and Manufacturing Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/909,932

(22) Filed: Aug. 12, 1997

Related U.S. Application Data (63) Continuation of application No. 08/882,561, filed on Jul. 3, 1997, now Pat. No. 6,088,038.

(51) Int. Cl.$^7$ ................................................ G09G 5/04
(52) U.S. Cl. ...................... 345/153; 345/150; 345/154; 345/155; 345/431; 345/199
(58) Field of Search ...................... 345/150, 153–155, 345/431, 438, 199; 358/515, 516, 518; 348/161, 659; 382/166

(56) References Cited

U.S. PATENT DOCUMENTS

| | | | | |
|---|---|---|---|---|
| 3,612,753 A | | 10/1971 | Korman ...................... 178/5.9 |
| 3,893,166 A | | 7/1975 | Pugsley ........................ 358/80 |
| 4,482,917 A | * | 11/1984 | Gaulke et al. ............... 358/518 |
| 4,500,919 A | | 2/1985 | Schreiber .................... 358/78 |
| 4,884,130 A | | 11/1989 | Huntsman .................... 358/80 |
| 4,884,221 A | | 11/1989 | Sugiyama et al. .......... 364/526 |
| 5,012,431 A | | 4/1991 | Stanziola .................... 364/526 |
| 5,105,267 A | | 4/1992 | Hayashi ........................ 358/80 |
| 5,233,684 A | * | 8/1993 | Ulichney .................... 395/131 |
| 5,305,119 A | * | 4/1994 | Rolleston et al. ........... 358/522 |
| 5,339,176 A | | 8/1994 | Smilansky et al. ......... 358/504 |
| 5,402,253 A | * | 3/1995 | Seki ........................... 358/518 |
| 5,432,906 A | | 7/1995 | Newman .................... 395/162 |
| 5,506,696 A | | 4/1996 | Nakano ....................... 358/504 |
| 5,526,285 A | | 6/1996 | Campo et al. ............... 364/526 |
| 5,528,386 A | * | 6/1996 | Rolleston et al. ........... 358/522 |

(List continued on next page.)

FOREIGN PATENT DOCUMENTS

| | | |
|---|---|---|
| EP | 0 475 554 | 3/1992 |
| EP | 0 622 952 | 11/1994 |
| EP | 0 706 285 | 4/1996 |
| EP | 0 604 755 | 12/1999 |
| WO | WO 93/20648 | 10/1993 |

OTHER PUBLICATIONS

International Color Consortium, "ICC Profile Format Specification," Version 3.3, Nov. 1996.*

(List continued on next page.)

*Primary Examiner*—Richard A. Hjerpe
*Assistant Examiner*—Henry N. Tran
(74) *Attorney, Agent, or Firm*—William D. Bauer

(57) ABSTRACT

A color mapping method is used in transforming colors between color imaging systems. The method includes using forward transformation profiles that characterize the color imaging systems to generate respective sets of device-independent color values for the color imaging systems. Color conversions are calculated by reducing differences between the respective sets of device-independent color values. Based on these color conversions, a color map is constructed that describes a relationship between the color imaging systems.

36 Claims, 6 Drawing Sheets

U.S. PATENT DOCUMENTS

| | | | | |
|---|---|---|---|---|
| 5,531,520 A | | 7/1996 | Grimson et al. | 382/131 |
| 5,541,742 A | | 7/1996 | Imao et al. | 358/518 |
| 5,564,006 A | * | 10/1996 | Reed | 395/161 |
| 5,579,031 A | * | 11/1996 | Liang | 345/154 |
| 5,732,205 A | * | 3/1998 | Astle | 395/131 |
| 5,760,913 A | * | 6/1998 | Falk | 358/298 |
| 5,857,063 A | * | 1/1999 | Poe et al. | 395/109 |
| 5,883,632 A | * | 3/1999 | Dillinger | 345/431 |
| 5,949,427 A | * | 9/1999 | Nishikawa et al. | 345/431 |
| 5,956,467 A | * | 9/1999 | Rabbani et al. | 358/539 |
| 5,963,201 A | * | 10/1999 | McGreggor et al. | 345/326 |
| 5,999,703 A | * | 12/1999 | Schwartz et al. | 395/109 |
| 6,025,885 A | * | 2/2000 | Deter | 348/661 |
| 6,088,038 A | * | 7/2000 | Edge et al. | 345/431 |

OTHER PUBLICATIONS

Stone et al., "Color Gamut Mapping and the Printing of Digit Color Images," ACM Trans. on Graphics 7(4), pp. 249–292, Oct. 1988.*

R.W.G. Hunt, "Revised Colour–Appearance Model for Related and Unrelated Colours," *COLOR Res. & Appl.*, vol. 16, pp. 146–165 (1991).

M. D. Fairchild and R. S. Berns, "Image Color–Appearance Specification Through Extension of CIELAB," *COLOR Res. & Appl.*, vol. 18, No. 3 (Jun. 1993).

M. D. Fairchild, "Visual Evaluation and Evolution of the RLAB Color Space," *Second IS&T/SID Color Imag. Conf.*, pp. 1–13, Scottsdale, AZ (Nov. 15–18, 1994).

M. R. Pointer and R.W.G. Hunt, "A Color Reproduction Index," *Second IS&T/SID Color Imaging Conference*, pp. 180–182, Scottsdale, Arizona (Nov. 15–18, 1994).

E.M. Granger, "A New Color Space for Image Appearance Equivalence," *Seybold Conference*, Boston, Massachusetts (Feb. 1992).

International Color Consortium, "International Color Profile Format," ISO/TC 130/WG2 N (Jun. 10, 1994).

ICC Profile Format Spec., Version 3.3, Int'l Color Consortium (Nov. 11, 1996),

G. Wyszecki and W.S. Stiles, "Chromatic Adaptation," Color Science, Concepts and Methods, Quantitative Data and Formulae, $2^{nd}$ Edition, pp. 429–450 (1982).

Stone et al., "Color Gamut Mapping and the Printing of Digital Color Images," *ACM Trans, on Graphics* 7(4), pp. 249–292 (Oct. 1988).

B.J. Lindblom, "Accurate Color Reproduction for Computer Graphics Applications," *Computer Graphics*, vol. 23, No. 3, Jul. 1989.

World Wide Web Sample Page from Numerical Recipes in C: The Art of Scientific Computing, Cambridge Unversity Press, pp. 410–420, 1992.

Po–Chieh Hung, "Color Rendition Using Three–Dimensional Interpolation," *SPIE Imaging Applications in the Work World*, vol. 900, pp. 111–115 (Jan. 12–13, 1988, L.A., California.

* cited by examiner

ARRANGEMENT FOR MAPPING COLORS BETWEEN IMAGING SYSTEMS AND METHOD THEREFOR

RELATED APPLICATION

This is a continuation of U.S. patent application Ser. No. 08/882,561, filed Jul. 3, 1997, now U.S. Pat. No. 6,088,038, the entire content of which is incorporated herein by reference.

FIELD OF THE INVENTION

The present invention relates to color imaging. More particularly, the present invention relates to mapping colors between color imaging systems.

BACKGROUND OF THE INVENTION

Color reproduction processes typically involve using color imaging systems to produce colors on various media. These color imaging systems may be used to duplicate a color image from one medium to another medium, e.g., from one printed copy to another or from a display screen to a printed copy. Color reproduction processes are used in various application environments, for example, color proofing applications.

Some color reproduction processes use approaches known as color management systems (CMSs) to characterize various color imaging systems and to transform color data between the color imaging systems. Characterizing color imaging systems typically involves calculating color response functions using color coordinate systems known as color spaces. One commonly-used color space is Commission Internationale de l'Éclairage L*a*b* (CIELAB) space. CMSs attempt to reproduce an original color image on a color imaging system so as to preserve the appearance of colors between the original and the reproduction within the limitations of the color imaging system of the reproduction process.

Various CMS approaches have been proposed to achieve accurate color reproduction. Many of these approaches involve producing color samples using an output or display device and measuring the color values of the samples using an input device. Such approaches correlate the output colors with the measured color values. This correlation is performed using, for example, forward and reverse transforms between device-specific color spaces and a device-independent color space. These transformation techniques are often supplemented by interpolation between entries in a multidimensional lookup table. These techniques exhibit inaccurate color conversion between similar devices, potentially resulting in undesirable contamination of colors. Furthermore, accurate color conversion of dark colors has often been particularly difficult because of inadequate processing of black channel data in many applications.

CMSs often perform gamut mapping to correlate the range or gamut of colors that can be realized by a device with regions of a color space. Because many devices are incapable of realizing the complete range of colors in a color space, gamut mapping typically involves compressing or scaling regions of the color space. The device can then approximate colors outside its gamut using the compressed regions of the color space. For many CMSs, gamut mapping is potentially inconsistent under certain circumstances, such as when using profiles generated by software from different vendors. In addition, many CMSs exhibit inconsistencies when performing forward and reverse transformations between imaging systems. For example, color shifting often occurs with repeated forward and reverse transformations.

Many CMS techniques exhibit other limitations in addition to the lack of accuracy in converting colors. For example, many CMS techniques are relatively inflexible with respect to changes in illumination and observer conditions, gamut mapping, and choice of color space. Certain techniques lack forward compatibility with future color standards.

SUMMARY OF THE INVENTION

According to one embodiment, the present invention is directed to a color mapping method for use in transforming colors between color imaging systems. The color mapping method includes using forward transformation profiles characterizing the color imaging systems to generate respective sets of device-independent color values for the color imaging systems. Color conversions are calculated by iteratively reducing differences between the sets of device-independent color values. This difference reduction is also optionally performed on black channel information to obtain a mapping of black channels between the color imaging systems. A color map describing a relationship between the color imaging systems is constructed by using the predicted color conversions. This method may be performed by a color mapping arrangement or a computer-executable program stored on a data storage medium.

According to another embodiment of the present invention, color mapping between imaging systems is accomplished by a conversion using profiles that characterize the color imaging systems to generate respective sets of device-independent color values for the source color imaging system and converting to the device-dependent data values of the destination color imaging system by performing a color conversion using the profiles. The device-independent color values have the same dimensionality as the corresponding color imaging systems. The color conversion can be used to improve its own accuracy relative to a quality threshold. The color conversion is used to define a color map for transforming colors between the color imaging systems.

Another embodiment of the present invention is directed to a color mapping arrangement for use in transforming colors between imaging systems. A computer arrangement uses forward transformation profiles that characterize the color imaging systems to generate respective sets of device-independent color values for the color imaging systems. The computer arrangement also calculates color conversions by iteratively reducing differences between the sets of device-independent color values. The computer arrangement uses the color conversions to construct a color map describing a relationship between the color imaging systems using the color conversions. A memory stores the color map.

The above summary of the invention is not intended to describe each disclosed embodiment of the present invention. This is the purpose of the figures and of the detailed description that follows.

BRIEF DESCRIPTION OF THE DRAWINGS

Other aspects and advantages of the present invention will become apparent upon reading the following detailed description and upon reference to the drawings in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a variety of systems and arrangements that characterize color imaging systems. The invention has been found to be particularly advantageous for transforming colors between different color imaging systems. An appreciation of various aspects of the invention is best gained through a discussion of these particular application examples.

According to one aspect of the present invention, a color mapping technique may be applied to a variety of color imaging systems to generate a color map that can be used to transform the color response of one color imaging system, referred to as a source color imaging system, to match the color response of another color imaging system, referred to as a destination color imaging system. The color mapping technique projects color coordinates in the color space used by the source color imaging system into, for example, a device-independent color space. Optimal color coordinates in the color space used by the destination color imaging system are determined to realize a relatively close match. As further explained below in connection with the example embodiments, color mapping technique then generates a color map based on the optimal color coordinates for a number of color coordinates in the color space used by the source color imaging system.

Figure 1:
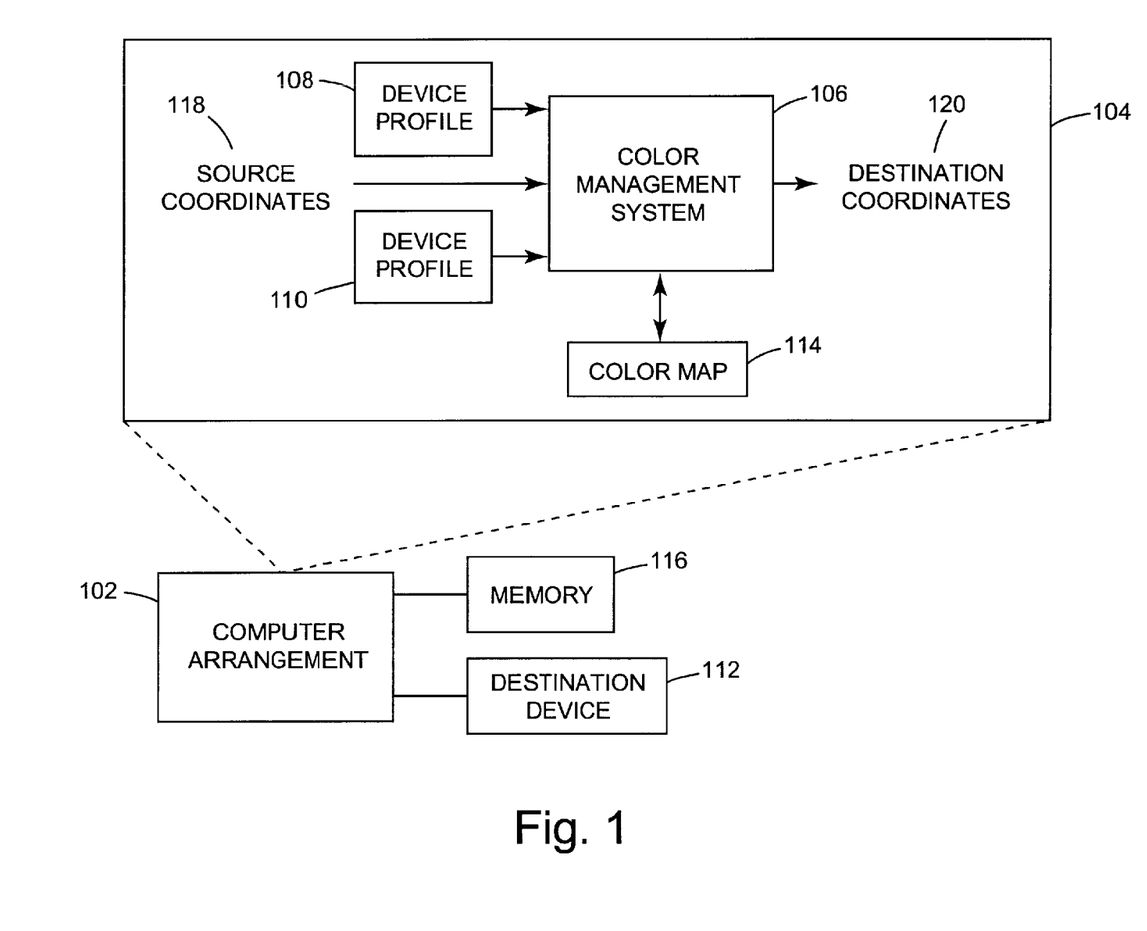
FIG. 1 is a block diagram illustrating an example color mapping system, according to an embodiment of the present invention.

FIG. 1 illustrates an example system 100 according to the present invention configured to transform colors between imaging systems. The system 100 includes an appropriately-programmed computer arrangement 102. The computer arrangement 102 may be implemented using any of a variety of conventional resources, for example, a personal computer and CD-ROM based software. Other computer-based designs may be used as well. For example, the computer arrangement 102 may be implemented using a microprocessor that acts with a read-only memory (ROM) into which a software application program is loaded. The software application program may be incorporated, for example, in a color-management software package.

A color mapping system 104 includes a color management system 106. The color management system 106 receives a source device profile 108 and a destination device profile 110. These device profiles describe mappings from device-dependent color coordinate systems used by respective color imaging systems to device-independent color coordinate systems.

The color management system 106 processes the source device profile 108 and the destination device profile 110 to generate a color map 114. The color map 114 describes a relationship between the source and destination devices. A memory 116 stores the color map 114. Subsequently, the color management system 106 uses the color map 114 to transform a set of source coordinates 118 in a device-dependent source device color space into a set of destination coordinates 120 in a device-dependent destination device color space.

Figure 2:
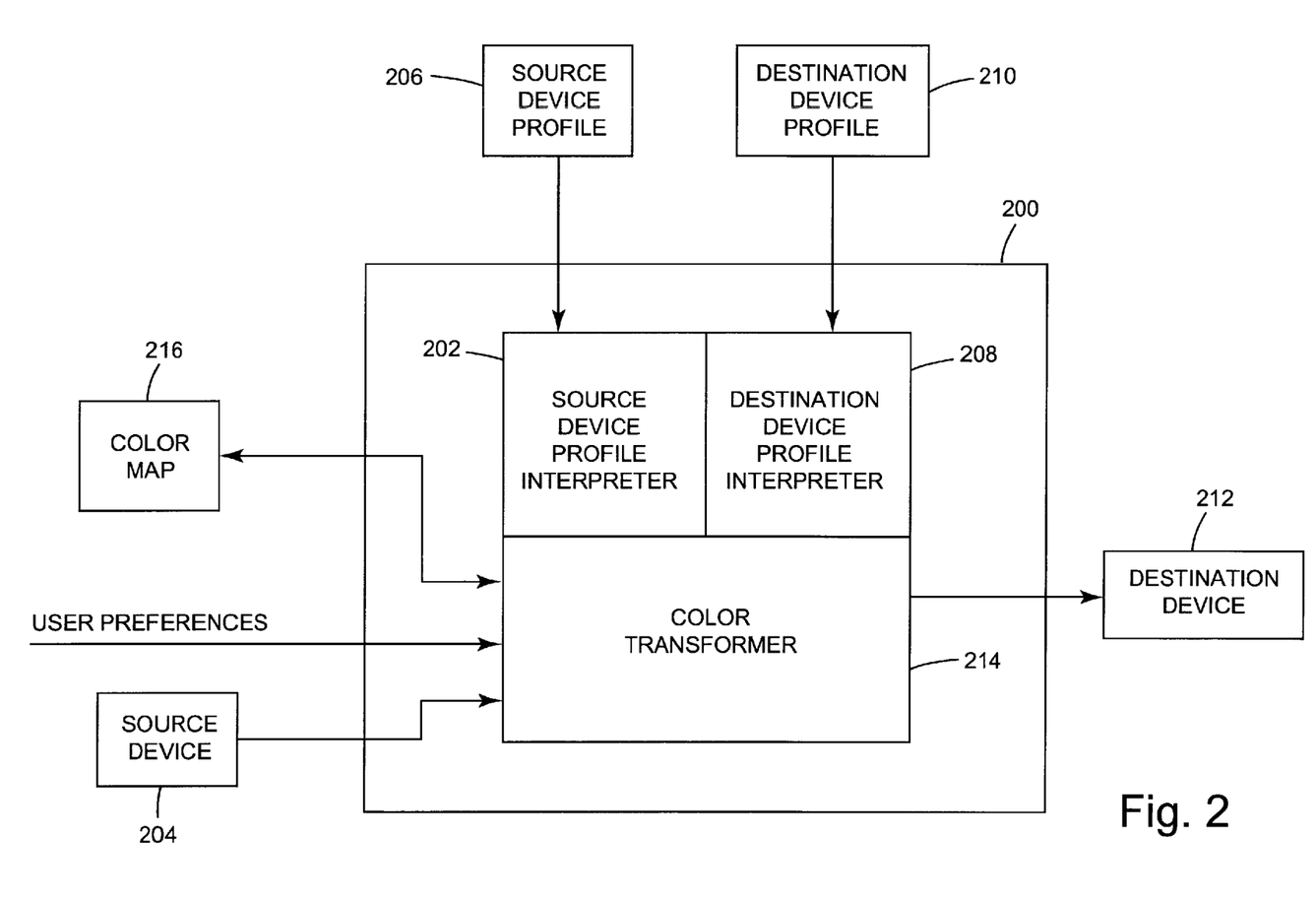
FIG. 2 is a block diagram illustrating an example arrangement implementing part of the color mapping system of FIG. 1, according to an embodiment of the present invention.

FIG. 2 illustrates an example color management system 200 for transforming colors between imaging systems according to the present invention. A source device profile interpreter 202 receives a source device profile 206. The source device profile 206 is used to map coordinates in the source device color space to a some form of color data, such as spectral or XYZ tristimulus values. For example, if the source device is a halftone color printer, the source device profile 206 may map CMYK color values to a XYZ color space. The source device profile interpreter 202 interprets the source device profile 206 and converts coordinates in the source device color space to a device-independent color space known as a profile connecting space (PCS). The PCS is used for converting the coordinates in the source device color space to the destination device color space or another color appearance model. The PCS may be, for example, the CIELAB color space. Another example PCS is described in copending U.S. patent application, entitled "Characterization of Color Imaging Systems" (Christopher Edge et al.), assigned to the instant assignee, filed on Jun. 27, 1997, and incorporated herein by reference.

A destination device profile interpreter 208 receives a destination device profile 210. The destination device profile 210 is used to map color coordinates in a destination device color space used by a destination device 212 to some form of color data, such as spectral or XYZ tristimulus values. For example, if the destination device 212 is a cathode ray tube (CRT) monitor, the destination device profile 210 may map color coordinates in a red-green-blue (RGB) color space to XYZ tristimulus values. The destination device profile interpreter 208 interprets the destination device profile 210 and converts color coordinates in the destination device color space to the PCS.

The source and destination device profile interpreters 202 and 208 may be implemented using any of a variety of hardware and software arrangements and are configurable for a variety of application environments. For example, if the source and destination device profiles 206 and 210 are International Color Consortium (ICC) device profiles, the source and destination device profile interpreters 202 and 208 are optionally configured to include white- and black-point parameters to account for color variations between media and colorants used by different color display devices. The source and destination device profile interpreters 202 and 208 can also be configured to include pleasing color corrections, such as L* resealing and a*b* hue adjustments. Alternatively, the pleasing color corrections can be incorporated into the color transformer 214. In certain other application environments, the source and destination device profile interpreters 202 and 208 are further configurable to include, for example, illuminant and observer functions.

The device profile interpreters 202 and 208 can be configured using any of a variety of approaches. For example, plug-in software modules can be used to configure the device profile interpreters 202 and 208. Using plug-in software modules obviates the need to use new versions of the color management system 200 or of the device profiles 206 and 210 when adding, for example, a newly defined color space, a custom illuminant, such as fluorescent light, or a new gamut mapping technique. These options can be selected, e.g., using a setup window at the operating system level. For example, if the operating system is Apple OS version 7.5, these options can be selected using a control panel interface.

If the device characterization is non-spectral, the color management system 200 can use the original spectral data that is saved with the profile to reconstruct the device profiles according to various conditions, such as illuminant functions and color space choices. For example, if one uses an RGB regression to convert scanner RGB values into color space values for a particular combination of color space and illuminant and observer conditions based on a set of spectral data, the regression for a new set of conditions can be generated based on the same spectral data. Accordingly, the device profiles 206 and 210 can be used to calculate color values for a variety of conditions and profile connecting spaces (PCS).

A color transformer 214 obtains PCS color coordinates from the source and destination device profile interpreters 202 and 208. The color transformer 214 uses these color coordinates to develop a color map 216 that expresses a relationship between the color spaces used by the source and destination devices 204 and 212. To generate the color map 216, the color transformer 214 may use any of a variety of gamut mapping techniques. One such technique that has been found to yield particularly accurate results involves reducing the color error between the source and destination devices. The color error is defined, for example, by Euclidean distance in the PCS or by the weighted sum of squared errors in a color space that is polar in the chromatic dimensions of the PCS. Defining the color error using a weighted sum of squared errors results in a mapping between color imaging systems that accurately maintains colors in reproduced images. By using error reduction techniques with forward profiles, the color transformer 214 avoids generating significant cumulative error in performing multiple forward and reverse transformations between color spaces.

The color transformer 214 is implemented using, for example, a software program, and can be configured for a variety of applications. For example, the color transformer 214 can be configured to perform a 100% black point scaling for mapping a printed color image to a monitor display of the image. On the other hand, because newsprint has a relatively weak black point attributable to its ink density and light-transmitting properties, the color transformer 214 can be configured to perform, for example, a 50% black point scaling when mapping a color image printed on newsprint to the Matchprint™ color imaging system. The color transformer 214 is also configurable to use, for example, illuminant and observer functions, which the color transformer 214 provides to the source and destination device profile interpreters 202 and 208. The color management system 200 receives user preferences from an input 218 to determine how to configure the color transformer 214.

After developing the color map 216, the color transformer 214 can be used to transform colors between the source and destination devices 204 and 212. The color transformer 214 receives color coordinates in the source device color space and transforms them using the color map 216. This transformation produces a set of color coordinates in the destination device color space. The destination color imaging system then reproduces the color on the destination device 212 using these color coordinates.

Figure 3:
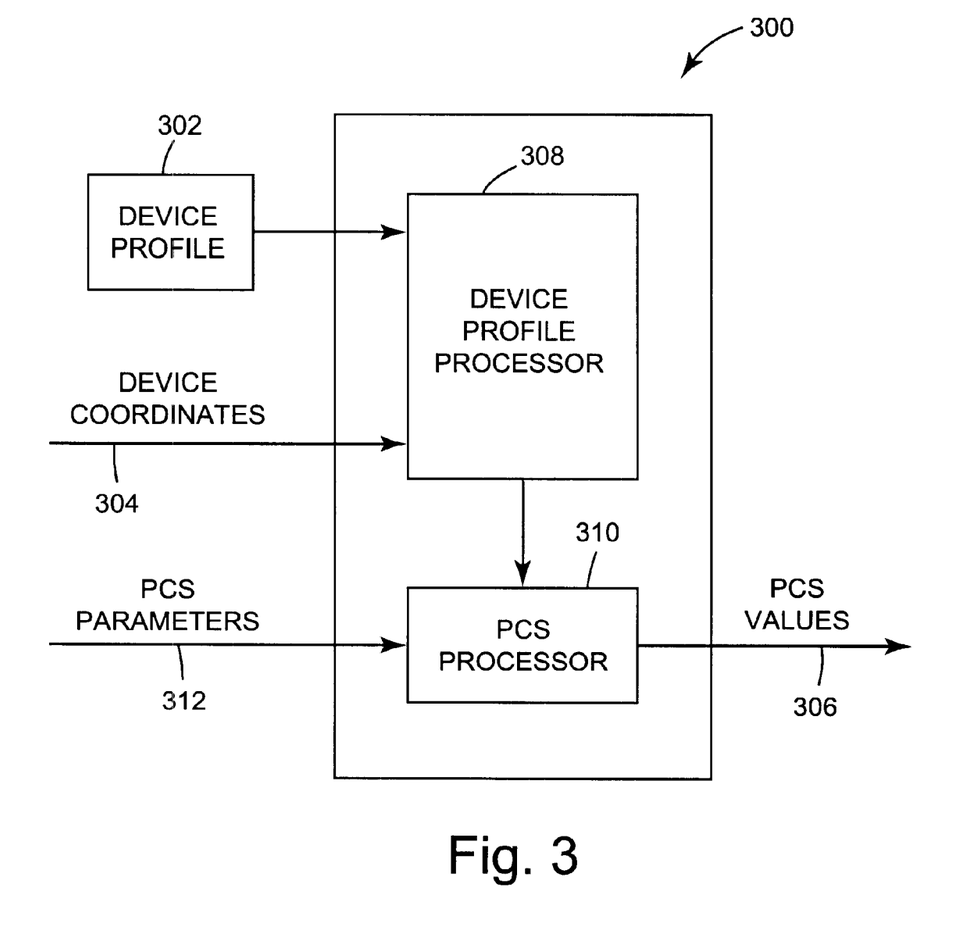
FIG. 3 is a block diagram illustrating another example arrangement implementing part of the color mapping system of FIG. 1, according to an embodiment of the present invention.

FIG. 3 illustrates an example device profile interpreter 300 implementing part of the color management system 200 of FIG. 2. The device profile interpreter 300 uses a device profile 302 to convert device coordinates received at an input 304 to PCS color coordinates, which the device profile interpreter 300 provides at an output 306. The device profile 302 describes the relationship between the device coordinates and some form of color data. Additionally, the device profile 302 optionally stores the raw spectral data used to construct the device profile 302. The raw spectral data allows the system to subsequently construct more accurate device profiles 302 and permits forward compatibility for changes in anticipation of change in ICC specifications. This updating can be performed by the system automatically.

The system can also detect that some component of the device profile 302 is out of date for recalibration. Updates can also be performed periodically based on a schedule. To update the device profile 302, a new profile can be generated using a recalibration procedure, for example, as described in U.S. patent application Ser. No. 08/431,614, entitled "Apparatus and Method for Recalibrating a Multi-Color Imaging System," assigned to the instant assignee and incorporated herein by reference.

A device profile processor 308 receives the device coordinates from the input 304 and the device profile 302. The device profile 302 may be, for example, an ICC profile. If the device profile 302 exists in this format, the device profile processor receives the forward portion of the profile, i.e., the portion used for converting device coordinates to PCS color coordinates. Alternatively, the device profile 302 can be stored in another format. The device profile processor 308 processes the device coordinates using the device profile 302 and outputs certain data based on the device profile 302. For example, if the device profile 302 is an ICC profile, the device profile processor 308 outputs XYZ tristimulus values for a particular set of observer conditions (e.g., illuminant and observer functions). If the device profile 302 is based on spectral data, the device profile processor 308 outputs spectral data. The device profile processor 308 can be configured for a variety of applications. For example, a user can select between absolute and relative colormetrics and can configure viewing conditions, such as observer or illuminant functions.

A PCS processor 310 receives the data output from the device profile processor 308 and a set of PCS parameters from an input 312. The PCS parameters may include, for example, XYZ tristimulus values for the media white, the illuminant white, and the black point, as well as black-point scaling from an absolute black to the media black. The PCS processor 310 generates the PCS values as a function of the data received from the device profile processor 308 and the PCS parameters.

Figure 4:
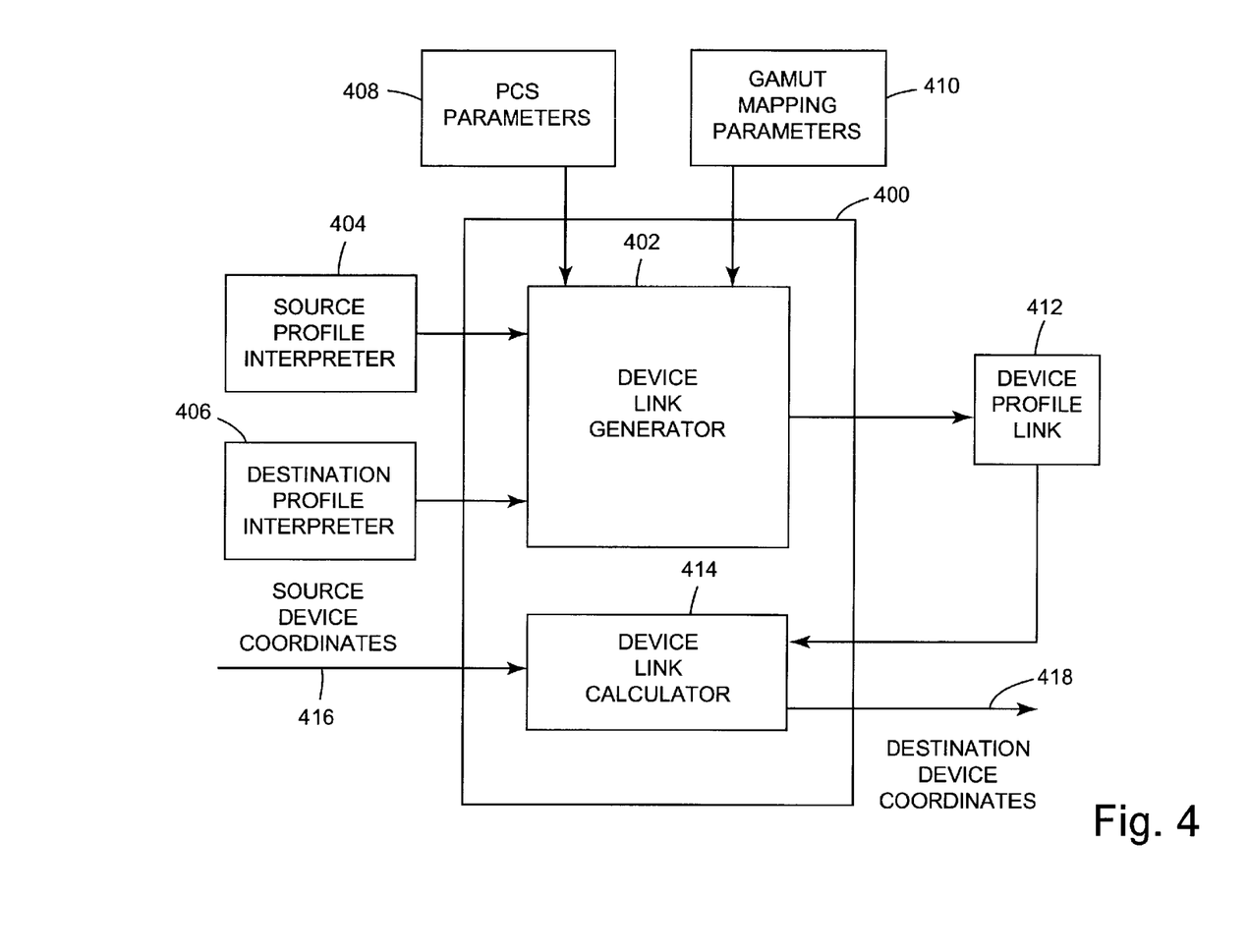
FIG. 4 is a block diagram illustrating yet another example arrangement implementing part of the color mapping system of FIG. 1, according to an embodiment of the present invention.

FIG. 4 illustrates an example color transformer 400 implementing part of the color management system 200 of FIG. 2. A device link generator 402 receives as input at least one source profile and one destination profile. While FIG. 4 illustrates the device link generator 402 receiving a source device profile from a source profile interpreter 404 and a destination device profile from a destination profile interpreter 406, it should be understood that the device link generator 402 may also receive one or more device profiles that are intermediate between the source and destination device profiles. For example, a device profile characterizing an RGB monitor can be intermediate between a source device profile characterizing an RGB scanner and a destination device profile characterizing a CMYK printer. The source and destination device profiles are forward transforms and optionally include configurable viewing conditions and PCS parameters. The device link generator 402 also receives a series of PCS parameters 408 to improve linking of different device types (e.g., CRT monitors and printers). The gamut mapping parameters 410 improve mapping of out of gamut colors between device types.

The device link generator 402 generates a color map or device profile link 412 that maps colors between two devices, e.g., from an RGB device to a CMYK device or between two CMYK devices. The device profile link 412 includes, for example, a mathematical expression or a look-up table. The color transformer 400 optionally stores the device profile link 412 in a memory, such as a random access memory (RAM), or saves it as a file for multiple transformations between the source and destination device color spaces.

A device link calculator 414 receives source device coordinates from an input 416 and processes them using the device profile link 412. The device link calculator 414 uses a noniterative forward calculation to transform the source device coordinates to a set of destination device coordinates for presentation at an output 418. Because the device link calculator 414 uses a noniterative forward calculation, the transformation process is relatively fast. If the device profile link 412 is a look-up table, the device link calculator 414 optionally uses linear interpolation to refine the destination device coordinates. The device link calculator 414 can be implemented, e.g., using a conventional multidimensional linear interpolator.

Figure 5:
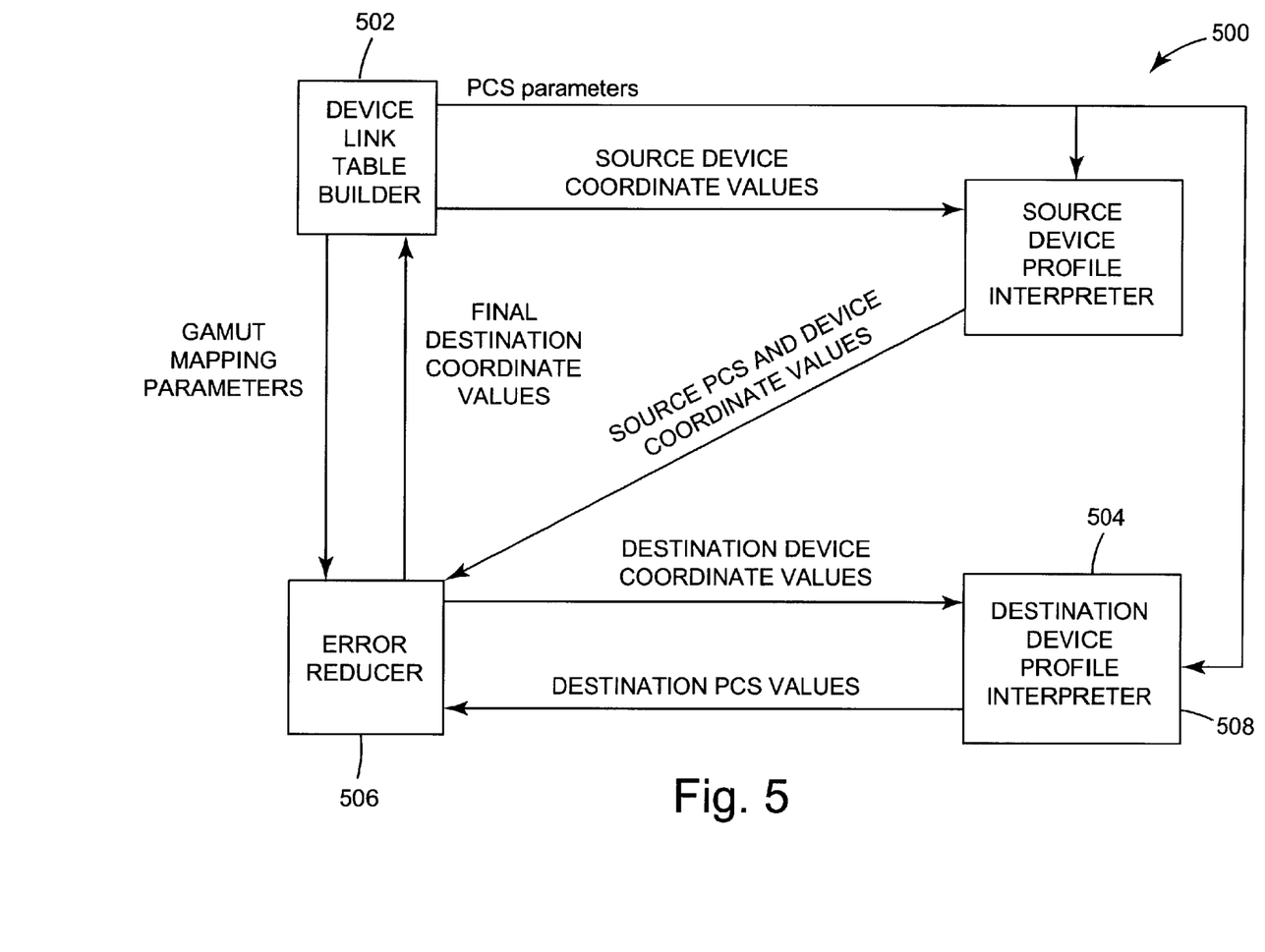
FIG. 5 is a block diagram illustrating still another example arrangement implementing part of the color mapping system of FIG. 1, according to an embodiment of the present invention.

FIG. 5 illustrates an example device link generator 500 that implements part of the color transformer 400 of FIG. 4. The device link generator 500 includes a device link table builder 502 that creates a look-up table to enable rapid interpolation of destination device coordinates from source device coordinates. It should be understood that if the device profile link is a mathematical expression rather than a look-up table, an analogous transformation generator replaces the device link table builder 502. Such a transformation builder may, for example, generate coefficients for use in the mathematical expression. To facilitate the discussion, however, the device link generator 500 is assumed to include a device link table builder 502. The device link table builder 502 generates the look-up table by generating a series of source device coordinates as input value entries and determining the optimal destination device coordinates as output values corresponding to the input values. The device link table builder 502 generates a subset of source device coordinates using, for example, a series of nested loops, one loop for each dimension of the source device color coordinate space.

To reduce the computational and memory requirements for constructing and storing the look-up table, the look-up table typically contains a relatively small number of entries along each dimension. With a relatively small table, interpolation is used to convert source coordinates to destination coordinates. The total number of entries in the look-up table can be expressed as $D_d N_s^d$, where d is the dimensionality of the source device color space, $D_d$ is the dimensionality of the destination device color space, and $N_s$ is the number of entries along each dimension of the look-up table. For example, a look-up table that is used to transform color coordinates between two CMYK (i.e., four-dimensional) color spaces, with 17 samples along each dimension, contains $4 \times 17^4$, or 334,084 entries.

It should be understood that the look-up table need not have the same number of entries along each dimension. If the look-up table contains $N_k$ entries along each respective dimension, where k ranges from 1 to d, the total number of entries in the look-up table can be expressed as $$D_D = \prod_{k=1}^{d} N_k.$$

For example, a look-up table that is used to transform color coordinates between two CMYK color spaces and that is to have fifteen entries along three dimensions and seventeen entries along one dimension contains $4 \times 15 \times 15 \times 15 \times 17$, or 229,500 entries.

In application environments in which it is desirable to further reduce computational and memory requirements, the device link table builder 502 may select only a subset of the total number of entries in each dimension of the look-up table, perform the method loop calculations using that subset, and perform, for example, a spline interpolation to fill in the remaining entries of the look-up table.

The device link table builder 502 provides PCS parameters and source device coordinates to a source device profile interpreter 504. The source device profile interpreter 504 generates source PCS values and provides the source PCS values and the source device coordinates to an error reducer 506. In a specific embodiment, the error reducer 506 is implemented using an error minimization technique. Using the source device coordinates, the error reducer 506 estimates an initial set of destination coordinates that are likely to realize an accurate color match with the source device coordinates. This estimation process may be performed using a relatively simple technique. For example, for estimating destination coordinates in an RGB space corresponding to source coordinates in a CMYK color space, the estimation process may use the following equations:

$C=1-R$ $M=1-G$ $Y=1-B$

Alternatively, the source coordinates can be used as estimates of the destination coordinates if the source and destination imaging systems use similar color coordinate spaces.

The error reducer 506 provides the set of estimated destination device coordinates to a destination device profile interpreter 508, which also receives the PCS parameters from the device link table builder 502. The destination device profile interpreter 508 then generates a set of destination PCS values as a function of the estimated destination device coordinates and the PCS parameters and provides the destination PCS values to the error reducer 506. If the error between the destination PCS values and the source PCS values is non-zero, the error reducer 506 uses an error reduction (e.g., an error minimization) technique to reduce the error between the source and destination PCS values. In one embodiment, this is implemented by repeatedly querying the destination device profile interpreter 508 with selected estimates of destination device coordinates. This process can continue until destination device coordinates are found that satisfy a quality threshold, for example, that yield the minimum error. The error reducer 506 returns these destination device coordinates to the device link table builder 502, which enters them in an appropriate location in the look-up table. The device link table builder 502 then enters the next set of table input entries corresponding to a set of source device color coordinates.

For colors within the gamut of the destination device, the error can be reduced using any of a variety of reduction techniques. For example, Powell's method can be used to perform the error reduction or error minimization. For additional information regarding Powell's method, reference may be made to William H. Press et al., *Numerical Recipes in C* (1992), pp. 309–315, available from Cambridge University Press, incorporated herein by reference and attached hereto as Appendix A.

Using this approach, the error reducer 506 generally defines an error function having input parameters that can be varied by the error reduction technique. The error reducer 506 then determines the optimal values of the input parameters resulting in a minimal error. To determine the values of destination device coordinates producing the minimum PCS error between the source and destination PCS values, the variable input parameters are the destination device coordinates. Accordingly, in this specific implementation, the error reducer 506 defines the error function as:

$$\text{Error}(D) = \Delta E(R_s, R_d(D))$$

where D is a vector defined by the destination device coordinates, $R_s$ is a vector defined by the source PCS values and $R_d(D)$ is a vector function producing destination PCS values as a function of the destination coordinate vector D, and $\Delta E$ is the Euclidean distance between $R_s$ and $R_d(D)$. The Euclidean distance may be expressed using the following equation:

$$\Delta E(R_1, R_2) = \sqrt{(L_1-L_2)^2+(a_1-a_2)^2+(b_1-b_2)^2}$$

The above equation assumes that the PCS is implemented as the CIELAB color space. It should be understood, however, that other color spaces may be used as a PCS. For example, one color space that is particularly suited for use as a PCS is described in the previously-referenced copending U.S. patent application, entitled "Characterization of Color Imaging Systems."

Using this same approach, a non-zero minimum error indicates that the source device is out of gamut relative to the destination device at that location in the PCS. In such situations, the error reducer 506 optionally uses the destination device coordinates that result in a minimum $\Delta E$ value. Alternatively, the error reducer 506 may use these values as an initial estimate and recalculate the optimal destination device coordinates using a new error function that employs weighting factors, polar coordinates in the chromatic plane of the PCS space, or both.

The error reducer 506 optionally uses a gamut mapping parameter received from the device link table builder 502 to decide how to map coordinates that are out of gamut relative to the source device. For example, the gamut mapping parameter may specify modes in which each technique is used for obtaining destination device coordinates. One mode, for example, may use lightness, chroma, and hue values $L^*$, $C^*$, and $h^*$ instead of LAB values $L^*$, $a^*$, and $b^*$, where:

$$C^* = \sqrt{(a^{*2}+b^{*2})},$$

and $$h^* = C^* \cdot \text{ARCTAN}(b^*/a^*).$$

Another mode uses the above lightness, chroma, and hue values as well as weighting factors:

$$\text{Error}(D) = \Delta EW(R_s, R_d(D), W)$$

$$\Delta EW(R_1, R_2, W) = \sqrt{W_L(L_1-L_2)^2+W_C(C_1-C_2)^2+W_h(h_1-h_2)^2}$$

where the PCS vectors $R_s$, $R_d(D)$ are converted to lightness, chroma, and hue values either before or after passing them to the error function.

If each of the weighting factors is equal to one, the above-weighted error reduction function $\Delta EW(\ )$ is identical to the standard $\Delta E(\ )$ error reduction function. It should be noted, however, that weighting factors of $W_L=3$, $W_C=1$, and $W_h=1.5$ yield particularly accurate visual results. These weighting factors produce an error function that gives priority first to lightness, then to hue, then to chroma. These weighting factors can also be provided to the error reducer 506 as gamut mapping parameters by the device link table builder 502.

Creating the device profile link via error reduction of the forward transformations of the devices realizes a number of advantages. For example, errors in color conversion are limited to those attributable to quantization and interpolation. As a result, the cumulative error from repeated forward and reverse transformations between the source and destination device color spaces is substantially reduced. Additionally, the color transformer can select the gamut mapping technique. The color transformer can rely on the forward transform information and realize consistent gamut mapping between device profiles supplied by different vendors. It should be noted that errors due to interpolation of the device profile link decrease as the number of table entries in each dimension of the look-up table increases toward the maximum number of gray levels. This error also decreases if a one-dimensional tone reproduction table is used to transform the color values. For additional information regarding the use of a one-dimensional tone reproduction table, reference is made to U.S. Pat. No. 5,432,906, issued to Gary H. Newman, assigned to Eastman Kodak Company, and incorporated by reference.

Creating the device profile link using error reduction also allows transformation between CMYK device spaces that maps the tone response of the source and destination black (K) channels while maintaining an accurate match with the $L^*a^*b^*$ data. For transformation from an RGB source device to a CMYK destination device, the RGB color coordinates used by the source device lack K channel information. Some conventional color transformation techniques use a process known as gray component replacement (GCR) to define a relationship between K values and CMY values in the reverse transformation (i.e., $L^*a^*b^*$ to CMYK). For example, the reverse transformation may be performed with K initially set to zero. The value of K can then be calculated based on the minimum of the C, M, and Y values. The CMY values can then be recalculated using an algebraic calculation or using the forward model to obtain the closest value of $L^*a^*b^*$ input using the new calculated K value. This process involves a reverse transformation from L*a*b* color values to CMYK color values with a fixed definition of GCR.

This process, however, loses the K channel information or the CMY channel information during the translation between CMYK color spaces because the source color values are transformed to a three-dimensional intermediary color space during conversion to destination CMYK values. To preserve the K channel information, the error reducer 506 determines optimal K values in the destination color space that correspond to the K values in the source device color space, e.g., values between 0 and 255. These values can be created, for example, by generating a series of source K values ranging from minimum to maximum, fixing the source and destination CMY values at 0, and finding destination K values with minimum ΔE error relative to each of the source K values. These source and destination K values can be loaded into a lookup table for quick conversion of source K to destination K values. By using error reduction to determine optimal K values in the destination color space, the device link generator 500 preserves K channel information. This results in improved accuracy of the K channel information when converting colors between CMYK devices.

After loading the source and destination K values into a lookup table, when the error reducer 506 receives source L*a*b* and CMYK values, the error reducer 506 initially maps the source K channel to the destination K channel. The error reduction procedure is then used for varying the destination CMY values to obtain the best match for the respective L*a*b* values. If ΔE=0, control returns to the device link table builder 502, which enters the calculated destination CMYK values into the device link table. If ΔE is greater than zero, then the destination CMY values corresponding to the destination K value in question are out of gamut relative to the target L*a*b* values. This may be, for example, because the source CMY values corresponding to K=0 result in a color that is out of gamut with the destination device, or because the destination K value in the particular region of destination CMY color space is either too high or too low, i.e., the mixture of K with CMY is such that the resulting color is too dark or too light relative to the targeted L*a*b* value.

To reduce the ΔE error, K can be varied in a controlled way so as to ensure both optimal L*a*b* color and optimal matching of the K source channel behavior. This can be performed, for example, by alternately fixing the current CMY values while performing error reduction on variable K values and fixing the K value while performing error reduction on variable CMY values. When it is determined that neither varying CMY nor varying K improves the ΔE error, it can be assumed that the optimal CMYK values have been determined to satisfy both the color matching and K channel accuracy criteria. Control then optionally returns to the device link table builder 502. While the above discussion assumes that the error reducer 506 performs the mapping between source and destination K values, it should be understood that the device link table builder 502 can perform the mapping.

It should be understood that other approaches can be used to improve the accuracy of the K channel information. For example, the PCS can be implemented as a color space having the same number of dimensions, e.g., four, as CMYK space. Using a PCS having the same dimensionality as the device space prevents the loss of color channel information. In a specific example embodiment, the first three channels of this PCS are the PCS currently used by the system (e.g., L*a*b*, or XYZ). The fourth channel indicates a PCS value indicative of the black channel or relating to the black channel (e.g., L* or tristimulus value Y). The process can be performed in a manner similar to that performed by the ICC specification as in, for example, ColorSync 2.1 available from Apple Computer.

Figure 6:
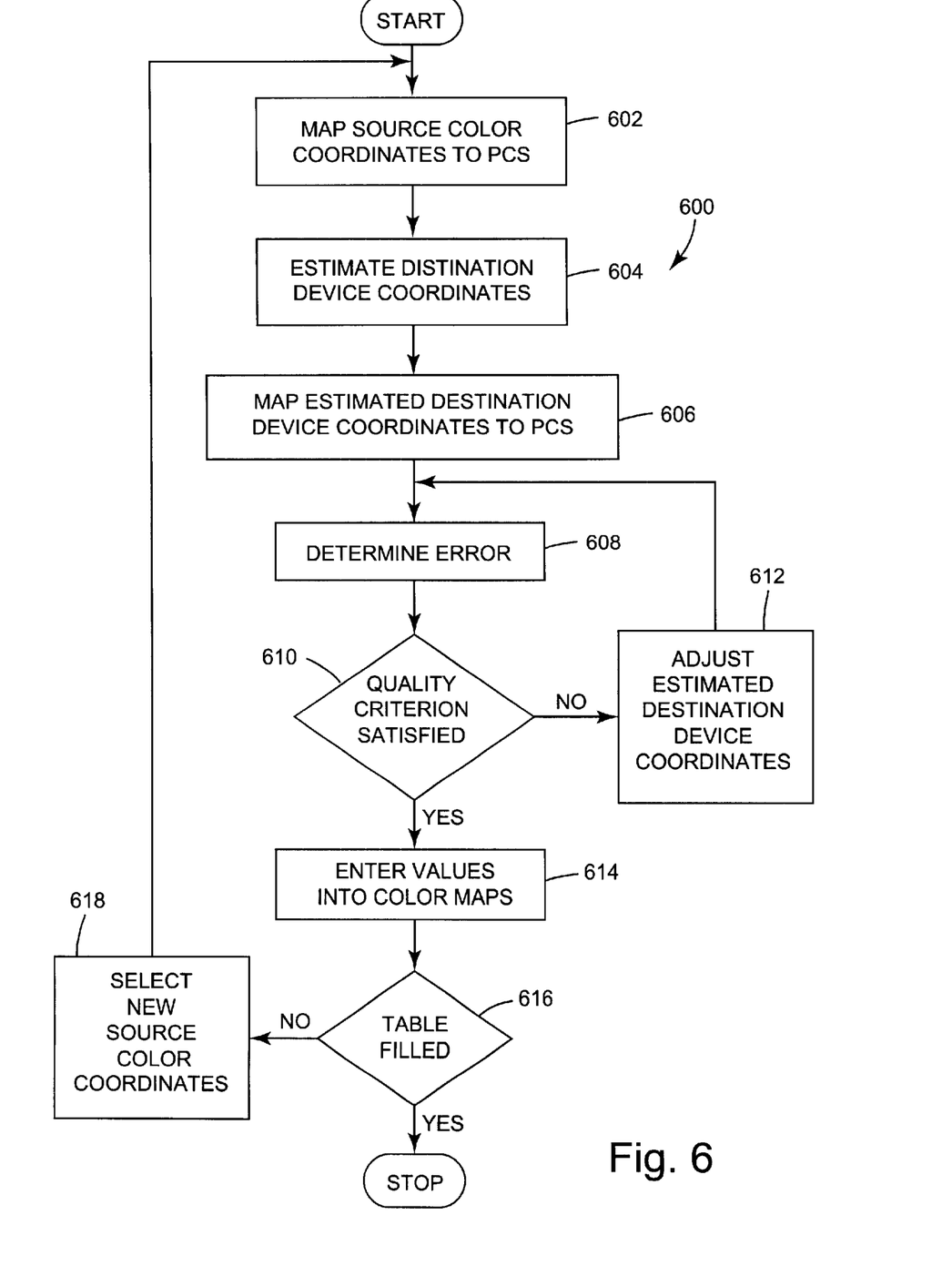
FIG. 6 is a flow chart illustrating an example color mapping method, according to another embodiment of the present invention.

FIG. 6 illustrates an example color transformation method 600 according to the present invention. At a block 602, selected source device color coordinates are mapped to a PCS. Destination device color coordinates are then estimated as a function of the source device color coordinates, as depicted at a block 604. These estimated destination device color coordinates are then mapped to the PCS at a block 606.

At a block 608, an error between the PCS values corresponding to the source and destination device color coordinates is determined. At a decision block 610, the method determines whether the error satisfies a quality criterion, such as error minimization. In certain applications, the quality criterion can be defined as reduction of the error below a threshold value. If the error does not satisfy the quality criterion, flow proceeds to a block 612, at which the estimated destination device color coordinates are adjusted to reduce the error. This process repeats until the error is reduced.

After the error is reduced, flow proceeds to a block 614, at which the optimal destination device color coordinates thus obtained are entered into a color map. Next, the method determines whether the color map is filled, as depicted at a decision block 616. If the color map contains empty entries, flow proceeds to a block 618. New source device color coordinates are then selected, and then flow returns to the block 602. This process continues until the color map is filled. The color map can then be stored as, for example, a data file for future reference. The user can specify the desired source, destination, and intermediate profiles and the user preferences used to generate the device profile link. Upon recognizing that a color map has already been developed for a particular combination of these profiles, the system can load the data file. Loading the data file instead of reconstructing the color map saves computation time and other resources.

The device profile link can be generated each time the user requests a new combination of device profiles. Alternatively, the user can specify in advance a series of source, intermediate, and destination profiles and allow the system to preprocess these lists of profiles into their respective device profile links and store them. When the user requests that a particular transform be performed on image data using a previously defined combination of source, intermediate, and destination profiles, the system retrieves the associated device profile link. Retrieving the device profile link improves the processing speed.

While the above discussion has assumed that the device profile link describes a conversion between two device profiles, it should be understood that the device profile link can be used to describe a conversion between any number of device profiles. For example, N device profiles can be concatenated using a single device profile link. To concatenate the device profiles, the color conversion is performed using the PCS to convert colors between each device profile to be concatenated. Performing error reduction on the forward transforms between the individual device profiles improves the accuracy of the concatenated device profile link between the first and nth device profiles.

The various embodiments described above are provided by way of illustration only and should not be construed to limit the invention. Those skilled in the art will readily recognize various modifications and changes that may be made to the present invention without strictly following the example embodiments and applications illustrated and described herein, and without departing from the true spirit and scope of the present invention, which is set forth in the following claims.

What is claimed is:

1. For use in transforming color between color imaging systems, a color mapping method comprising:

providing forward transformation profiles that characterize the color imaging systems;

using the forward transformation profiles to generate respective sets of device-independent color values for the color imaging systems;

determining color conversions by iteratively reducing differences between the sets of device-independent color values, including performing a first reduction in differences between the device-independent color values for all color channels, wherein the first reduction is multi-dimensional, and performing a second reduction in differences between the device-independent color values for the black channel in addition to the first reduction; and constructing a color map describing a relationship between the color imaging systems using the color conversions, wherein the forward transformation profiles store spectral data, the method further comprising using the spectral data for reconstructing the profiles automatically.

2. For use in transforming color between color imaging systems, a color mapping method comprising:

providing forward transformation profiles that characterize the color imaging systems;

using the forward transformation profiles to generate respective sets of device-independent color values for the color imaging systems;

deterimining color conversions by iteratively reducing differences between the sets of device-independent color values, including performing a first reduction in differences between the device-independent color values for all color channels, wherein the first reduction is multi-dimensional, and performing a second reduction in differences between the device-independent color values for the black channel in addition to the first reduction; and constructing a color map describing a relationship between the color imaging systems using the color conversions, wherein the forward transformation profiles store spectral data, the method further comprising using the spectral data to allow for forward compatibility of the profiles in anticipation of change in standards specifications.

3. For use in transforming color between color imaging systems, a method according to claim 2, wherein the step of using the spectral data includes reconstructing the profiles automatically.

4. For use in transforming color between color imaging systems, a color mapping method comprising:

providing forward transformation profiles that characterize the color imaging systems;

using the forward transformation profiles to generate respective sets of device-independent independent color values for the color imaging systems;

determining color conversions by iteratively reducing differences between the sets of device-independent color values, including performing a first reduction in differences between the device-independent color values for all color channels, wherein the first reduction is multi-dimensional, and performing a second reduction in differences between the device-independent color values for the black channel in addition to the first reduction; and constructing a color map describing a relationship between the color imaging systems using the color conversions, wherein the forward transformation profiles store spectral data, the method further comprising using updated spectral data to allow for subsequently constructed profiles.

5. For use in transforming color between color imaging systems, a method according to claim 4, wherein using the updated spectral data includes reconstructing the profiles automatically.

6. For use in transforming color between color imaging systems, a method according to claim 5, wherein using spectral data includes reconstructing the profiles periodically.

7. For use in transforming color between color imaging systems, a method according to claim 5, wherein reconstructing the profiles periodically is a function of a schedule.

8. For use in transforming color between color imaging systems, a color mapping method comprising:

providing forward transformation profiles that characterize the color imaging systems;

using the forward transformation profiles to generate respective sets of device-independent color values for the color imaging systems;

determining color conversions by iteratively reducing differences between the sets of device-independent color values, including performing a first reduction in differences between the device-independent color values for all color channels, wherein the first reduction is multi-dimensional, and performing a second reduction in differences between the device-independent color values for the black channel in addition to the first reduction;

constructing a color map describing a relationship between the color imaging systems using the color conversions; and setting the device-independent color values for the non-black color channels to zero during the second difference reduction.

9. The method of claim 8, wherein the color channels include cyan, magenta, yellow, and black.

10. The method of claim 8, wherein the device-independent color values include L*a*b* color values.

11. A method comprising:

obtaining sets of device-independent color values for source and destination imaging devices;

reducing differences between the device-independent color values for all color channels, wherein the reduction of differences for all color channels is a multi-dimensional reduction;

reduction differences between the device-independent color values for the black channel;

generating a color map between the source and destination color imaging devices based on both the difference reduction for the black channel and the difference reduction for all color channels; and setting the non-black color channels to zero during the reduction of differences for the black channel.

12. The method of claim 11, further comprising keeping the black channel substantially fixed during the reduction of differences for all color channels.

13. The method of claim 11, wherein the color channels include cyan, magenta, yellow and black.

14. The method of claim 11, wherein the color channels include cyan, magenta, yellow, and black, and each of the difference reductions includes a multi-dimensional reduction of differences between the device-independent values for the cyan, magenta, yellow and black channels.

15. The method of claim 11, wherein the multi-dimensional reduction is configured such that each of the destination color channels varies with at least two source color channels.

16. A method comprising:
   obtaining sets of device-independent color values for source and destination imaging devices;
   reducing differences between the device-independent color values for all color channels, wherein the reduction of differences for all color channels is a multi-dimensional reduction;
   reducing differences between the device-independent color values for the black channel;
   generating a color map between the source and destination color imaging devices based on both the difference reduction for the black channel and the difference reduction for all color channels,
   wherein the color channels include cyan, magenta, yellow, and black, and each of the difference reductions includes a multi-dimensional reduction of differences between the device-independent values for the cyan, magenta, yellow, and black channels, and
   wherein:
   reducing the differences for the black channel includes reducing the differences for the cyan, magenta, yellow, and black channels while keeping the cyan, magenta, and yellow values set to zero, and
   reducing the differences for all color channels includes reducing the differences for the cyan, magenta, yellow, and black channels while keeping the black channel fixed at the levels determined from the reduction of differences for the black channel.

17. The method of claim 11, wherein the device-independent color values include L*a*b* color values.

18. A data storage medium containing a computer-executable program that, when executed:
   obtains sets of device-independent color values for source and destination imaging devices;
   reduces the differences between the device-independent color values for all color channels, wherein the reduction of differences for all color channels is a multi-dimensional reduction;
   reduces differences between the device-independent color values for the black channel;
   generates a color map between the source and destination color imaging devices based on both the difference reduction for the black channel and the difference reduction for all channels;
   wherein the non-black color channels are set to zero during the reduction of differences for the black channel.

19. The data storage medium of claim 18, wherein the black channel is substantially fixed during the reduction of differences for all color channels.

20. The data storage medium of claim 18, wherein the color channels include cyan, magenta, yellow, and black.

21. The data storage medium of claim 18, wherein the color channels include cyan, magenta, yellow, and black, and each of the difference reductions includes a multi-dimensional reduction of differences between the device-independent values for the cyan, magenta, yellow, and black channels.

22. The data storage medium of claim 18, wherein the multi-dimensional reduction is configured such that each of the destination color channels varies with at least two source color channels.

23. The data storage medium of claim 18, wherein the device-independent color values include L*a*b* color values.

24. A data storage medium containing a computer-executable program that, when executed:
   obtains sets of device-independent color values for source and destination imaging devices;
   reduces differences between the device-independent color values for all color channels, wherein the reduction of differences for all color channels is multi-dimensional reduction;
   reduces differences between the device-independent color values for the black channel;
   generates a color map between the source and destination color imaging devices based on both the difference reduction for the black channel and the difference reduction for all color channels,
   wherein the color channels include cyan, magenta, yellow, and black, and each of the difference reductions includes a multi-dimensional reduction of differences between the device-independent values for the cyan, magenta, yellow, and black channels, and
   wherein:
   reducing the differences for the black channel includes reducing the differences for the cyan, magenta, yellow, and black channels while keeping the cyan, magenta, and yellow values set to zero, and
   reduction the difference for all color channels includes reducing the differences for the cyan, magenta, yellow, and black channels while keeping the black channel fixed at the levels determined from the reduction of differences for the black channel.

25. A method of mapping of CMYK values between source and destination devices, the method comprising:
   (a) generating L*a*b* values for source and destination CMYK values;
   (b) iteratively reducing differences between the L*a*b* values by adjusting the destination K values and setting the destination CMY values to zero;
   (c) iteratively reducing differences between the L*a*b* values by adjusting the destination CMY values and keeping the K values substantially fixed at the levels determined in step (b); and
   (d) generating a color map based on both of the iterative difference reductions of steps (b) and (c).

26. The method of claim 25, further comprising, in the event the differences between the L*a*b* values are not initially reduced to an acceptable degree, iteratively reducing differences between the L*a*b* values by adjusting the destination K values and keeping the destination CMY values determined in step (c) fixed.

27. The method of claim 25, further comprising, in the event the differences between the L*a*b* values are not initially reduced to an acceptable degree:
   (e) iteratively reducing differences between the L*a*b* values by adjusting the destination K values and keeping the destination CMY values determined in step (c) fixed;

(f) iteratively reducing differences between the L*a*b* values by adjusting the destination CMY values and keeping the destination K values determined in step (e) fixed; and (g) repeating steps (e) and (f) on an alternating basis until differences between the L*a*b* values are reduced to the acceptable degree.

28. A data storage medium containing a computer-executable program that, when executed:

(a) generates L*a*b* values for source and destination CMYK values;

(b) iteratively reduces differences between the L*a*b* values by adjusting the destination K values and setting the destination CMY values to zero;

(c) iteratively reduces differences between the L*a*b* values by adjusting the destination CMY values and keeping the K values substantially fixed at the levels determined in step (b); and (d) generates a color map based on both of the iterative difference reductions of steps (b) and (c).

29. The data storage medium of claim 28, wherein, in the event the differences between the L*a*b* values are not initially reduced to an acceptable degree, the program iteratively reduces differences between the L*a*b* values by adjusting the destination K values and keeping the destination CMY values determined in step (c) fixed.

30. The data storage medium of claim 28 wherein, in the event the differences between the L*a*b* values are not initially reduced to an acceptable degree, the program:

(e) iteratively reduces differences between the L*a*b* values by adjusting the destination K values and keeping the destination CMY values determined in step (c) fixed;

(f) iteratively reduces differences between the L*a*b* values by adjusting the destination CMY values and keeping the destination K values determined in step (e) fixed; and (g) repeats steps (e) and (f) on an alternating basis until differences between the L*a*b* values are reduced to the acceptable degree.

31. A method for mapping of color values between source and destination devices, the method comprising:

(a) generating device-independent color values for source and destination device-independent values;

(b) iteratively reducing differences between the device-independent color values by adjusting the destination black channel values and setting the destination non-black channel values to zero;

(c) iteratively reducing differences between the device-independent color values by adjusting the destination non-black channel values and keeping the destination black channel values substantially fixed at the levels determined in step (b); and (d) generating a color map based on both of the iterative difference reductions of steps (b) and (c).

32. The method of claim 31, further comprising, in the event the differences between the device-independent color values are not initially reduced to an acceptable degree, iteratively reducing differences between the device-independent color values by adjusting the destination black channel values and keeping the destination non-black channel values determined in step (c) fixed.

33. The method of claim 31, further comprising, in the event the differences between the device-independent color values are not initially reduced to an acceptable degree;

(e) iteratively reducing differences between the device-independent color values by adjusting the destination black channel values and keeping the destination non-black channel values determined in step (c) fixed;

(f) iteratively reducing differences between the device-independent color values by adjusting the destination non-black channel values and keeping the destination black channel values determined in step (e) fixed; and (g) repeating steps (e) and (f) on an alternating basis until differences between the device-independent color values are reduced to the acceptable degree.

34. A data storage medium containing a computer-executable program that, when executed:

(a) generates device-independent color values for source and destination device-dependent color values;

(b) iteratively reduces differences between the device-independent color values by adjusting the destination black channel values and setting the destination non-black channel values to zero;

(c) iteratively reduces differences between the device-independent color values by adjusting the destination non-black channel values and keeping the black channel values substantially fixed at the level determined in step (b); and (d) generates a color map based on both of the iterative difference reductions of steps (b) and (c).

35. The data storage medium of claim 34, wherein, in the event the differences between the device-independent color values are not initially reduced to an acceptable degree, the program iteratively reduces differences between the device-independent color values by adjusting the destination black channel values and keeping the destination non-black channel values determined in step (c) fixed.

36. The data storage medium of claim 34, wherein, in the event the differences between the device-independent color values are not initially reduced to an acceptable degree, the program:

(e) iteratively reduces differences between the device-independent color values by adjusting the destination black channel values and keeping the destination non-black channel values determined in step (c) fixed;

(f) iteratively reduces differences between the device-independent color values by adjusting the destination non-black channel values and keeping the destination black channel values determined in step (e) fixed; and (g) repeats steps (e) and (f) on an alternating basis until differences between the device-independent color values are reduced to the acceptable degree.

* * * * *